July 14, 1959  E. E. SEILER  2,895,094
DEVICE FOR INDUCING NATURAL FREQUENCY VIBRATION
Filed July 30, 1957  2 Sheets-Sheet 1

FROM 13
POWER SUPPLY FOR 9

ERNST E. SEILER
*INVENTOR.*

July 14, 1959 E. E. SEILER 2,895,094
DEVICE FOR INDUCING NATURAL FREQUENCY VIBRATION
Filed July 30, 1957 2 Sheets-Sheet 2

ERNST E. SEILER
INVENTOR.

BY
W. E. Thibodeau, S. J. Rotondi
and A. D. Dupont

United States Patent Office 2,895,094
Patented July 14, 1959

2,895,094

DEVICE FOR INDUCING NATURAL FREQUENCY VIBRATION

Ernst E. Seiler, El Paso, Tex., assignor to the United States of America as represented by the Secretary of the Army Application July 30, 1957, Serial No. 675,235

6 Claims. (Cl. 318—119)

(Granted under Title 35, U.S. Code (1952), sec. 266)

The invention described herein may be manufactured and used by or for the Government for governmental purposes without payment of any royalty thereon.

The present invention relates to apparatus for inducing vibrations in an object at its natural vibrating frequency and analyzing the characteristics of these vibrations. The prior art devices constructed for this purpose utilized cumbersome and complicated mechanical or electrical equipment resulting in prohibitive costs and time consuming methods. These prior art devices usually required separation of the unit under test from its original environment to fasten it to a vibration testing machine resulting in an inaccurate analysis of the vibration characteristics of the unit in its original environment. The shock mounts for an object, the supporting area and other conditions of support are often overlooked in vibration testing, although they are significant factors that influence the vibrations of the unit under test. These factors must be examined separately where analysis is done on a vibration table and then correlated by mathematical or graphical means to determine the true vibration effects which occur. The complexity and inconvenience of such prior art devices is obvious. Utilization of the present invention allows an examination of the final vibrations of an object by means of a straightforward and quick operation. Additional collateral factors are not overlooked and are included in the original test. The vibration effects produced can be observed directly from any ordinary electrical indicating means such as an oscilloscope and a complete analysis of an object's vibration characteristics such as frequency, amplitude and velocity of vibration can be conducted easily and quickly.

It is accordingly an object of this invention to provide a compact, simple and inexpensive vibrator.

A further object of this invention is to provide a vibrator capable of inducing continuous vibrations in an object conforming to the natural vibration frequency of the object.

A still further object of this invention is to provide a device for continuously vibrating an object at its natural frequency and analyzing the physical characteristics of such vibrations.

Still another object of this invention is to provide a vibrator capable of inducing vibrations in an object while in its original and intended environment.

Other and further objects and features of the present invention will become apparent upon a careful consideration of the following detailed description when taken in conjunction with the accompanying drawings in which.

Figure 1:
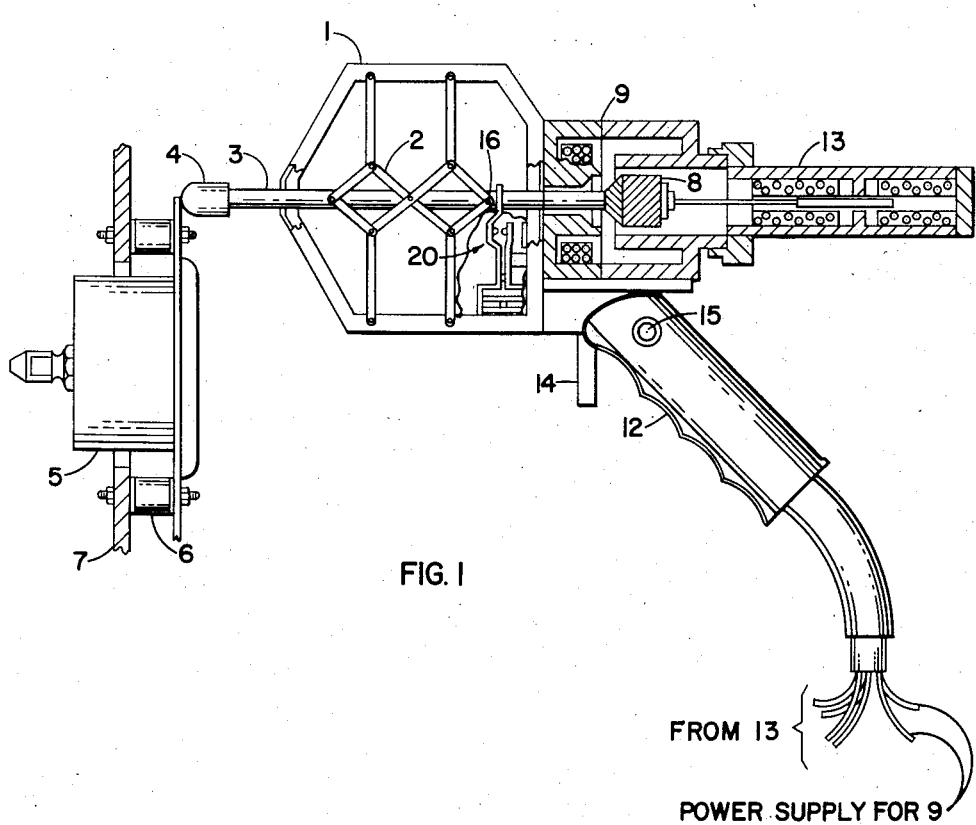
Figure 1 shows the mechanical construction of the invention.

The invention as illustrated is shaped like a revolver for ease in handling. The ultimate form and size of the invention may be changed to conform to the required use and such modifications are encompassed by the inventive concept disclosed herein. Referring to Figure 1, the framework 1 holds a displacement guide 2 which supports the stem 3. The displacement guide 2 is constructed to allow free movement of the stem 3 in a horizontal direction. A soft nipple 4 may be attached to the end of stem 3 to provide a larger contacting area, lessen slippage and prevent scratching or wearing of the unit under test. The test unit 5 is illustrated with support units 6 and baseboard 7. The supports 6 and baseboard 7 are illustrative of a general type of installation used although the present invention is effective with any other type of installation for the unit under test.

Figure 2:
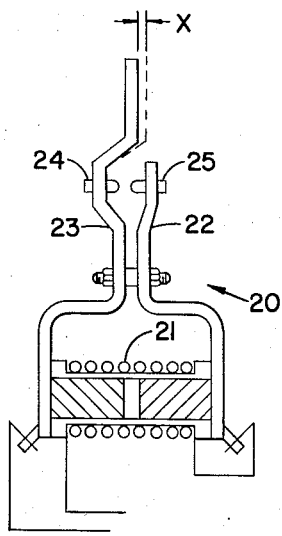
Figures 2 and 2a illustrate the detailed construction and operation of the switching system.

Stem 3 supports a plunger 8 which is drawn to the left in Figure 1 toward electromagnet 9 when it is energized. Plunger 8 should be of a highly magnetic material and accordingly stem 3 should preferably be of a non-magnetic material to provide an efficient magnetic attracting force between electromagnet 9 and plunger 8. The material surrounding plunger 8 should also be non-magnetic so as not to interfere with the magnetic attracting field between electromagnet 9 and plunger 8. The movement of plunger 8 forces stem 3 against the test unit 5 putting it under tension. This tension force moves the stem 3 back to the right in Figure 1 when electro magnet 9 is not energized. The current to electromagnet 9 is controlled by the switching element 20 which is shown in greater detail in Figure 2 and 2a. Switching element 20 controls the energizing current to electromagnet 9 and therefore controls the vibratory action of stem 3.

Figure 2A:
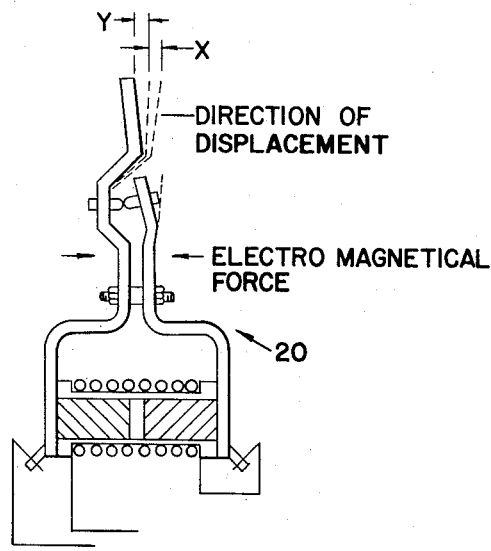

Switching element 20 comprises an electromagnet 21 with extended poles 22 and 23. Poles 22 and 23 are made of steel, or spring bronze blades which are equipped with steel or similar material, to take the electromagnetic force of the electromagnet 21. When electromagnet 21 is energized the contact points 24 and 25 tend to remain in contact even after the poles have returned to their rest position (Figure 2) because of the magnetic attraction of the poles 22 and 23. When stem 3 moves to the left in Figure 1, the resiliency of pole 23 causes it to travel sufficiently to the left to separate the poles. In Figure 2a this overtravel to the left is indicated by the distance Y. When the contact points 24 and 25 are separated the energizing current to electromagnet 21 is cut off since electromagnet 21 and the contact points 24 and 25 are connected in series.

Figure 3:
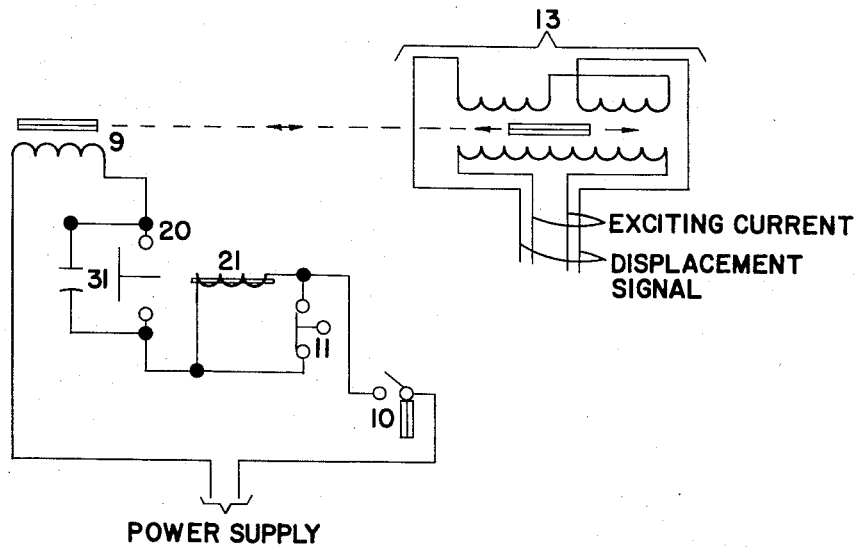
Figure 3 is a schematic diagram of the electrical aspects of the invention.

Figure 3 is a schematic diagram of the electrical circuitry of the invention. The capacitor 31 is introduced to reduce undesirable sparking between the contact points 24 and 25. Switch 10 is a safety switch and is normally open when the invention is not operating. Switch 11 is the operating switch and is normally closed when the machine is not operating. Opening switch 11 by pressing the knob 15 breaks the short circuit across the electromagnet 21, energizing it and putting the invention into operation.

The D. C. power supply may be of any voltage and current to provide adequate current for the proper operation of electromagnet 9.

The displacement pickup 13 is an additional feature of the invention that provides for examination of the vibrations produced. This displacement pickup is of the type disclosed by H. Schaevitz in his article titled "The Linear Variable Differential Transformer," Proceedings of the Society for Experimental Stress Analysis (volume IV, Number 2, 1946). These pickups and their associated uses and operation are further described in a brochure issued by the Schaevitz Engineering Company of Camden, New Jersey, identified as Bulletin AA-1A and titled "Notes on Linear Variable Differential Transformer." The construction and operation of this type of pickup is adequately discussed in the articles mentioned above and will not be repeated here.

Operation of the invention is relatively simple. The vibrator is pressed against the object under test, switch 10 is closed by pulling the trigger 14 toward the handle and switch 11 is opened by applying pressure to the knob 15. An examination of the drawings will further indicate the mode of operation of the invention. When the stem 3 is forced back, the pin 16 on the displacement guide 2 forces the extended portion of pole piece 23 against the opposing pole piece 22, closing the contacts 24 and 25 and energizing electromagnet 21. The necessary distance of travel to join contacts 24 and 25 is indicated by the dimension X in Figure 2.

Joining the contacts 24 and 25 also provides current for electromagnet 9 which forces stem 3 forward. Because of the magnetic attraction between pole pieces 22 and 23 the energizing current for electromagnet 9 is not cut off until pole piece 22 travels a distance Y as illustrated in Figure 2a. The stem 3 is thus driven forward into the test unit causing a deflection thereof. After the pole pieces have traveled the distance Y the contacts 24 and 25 separate and the energizing current is stopped. The resiliency of the material under test forces the stem 3 back to the right of Figure 1, pole pieces 22 and 23 are again brought together and the cycle repeats. The apparatus can be stopped by releasing switch 10 or 11 or by moving stem 3 off the object under test.

Numerous modifications and alterations of the structure which have been disclosed herein for purposes of illustration will be apparent to one skilled in the art and it is obvious that the same may be made without departing from the spirit and scope of the invention defined in the following claims.

I claim:

1. Vibration inducing and measuring apparatus comprising, in combination, a rigid support member fixedly secured to a frame, guide means moveably secured to said support member, vibration inducing means mounted on said guide means consisting of a stem member communicating with and responsive to movement of a plunger member, said plunger member being moveably responsive to first electromagnetic means, means for energizing said first electromagnetic means, second electromagnetic means mounted on said support member to control energization of said first electromagnetic means, means mounted on said moveable guide means to contact said control means to open and close said control means, said contact means being operatively dependent for contact with said control means upon the relative position of said moveable guide means, and means communicating with said plunger element for measuring induced vibration.

2. The combination of claim 1 wherein said vibration inducing means moves horizontally with relation to said support member.

3. The combination of claim 1 wherein said stem and plunger members of said vibration inducing means are integral.

4. The combination of claim 1 wherein said second electromagnetic means consists of an electromagnet having two extended poles, one of said poles being elongated with respect to the other.

5. The combination of claim 1 wherein said contact means consists of an arm positioned for contact with said second electromagnetic means.

6. Vibration inducing and measuring apparatus comprising, in combination, a substantially rectilinear frame having a base member fixedly secured thereto, moveable guide means pivotly secured to said frame and frame base member, a vibration inducing stem mounted on said guide means for movement horizontal to said frame base member, said stem communicating with and movably responsive to movement of a plunger, said plunger being movably responsive to first electromagnetic means, means for energizing said first electromagnetic means, means for controlling energization of said first electromagnetic means consisting of an electromagnet mounted on said frame base member and having two extended poles, one of said poles being elongated with relation to the other, and an arm mounted on said movable guide means positioned for contact with said elongated magnet pole, said control means being operatively dependent upon the relative position of said movable guide means, and means for measuring induced vibrations communicating with and movably responsive to movement of said plunger.

References Cited in the file of this patent
UNITED STATES PATENTS

| | | |
|---|---|---|
| 1,488,774 | Atwood | Apr. 1, 1924 |
| 2,511,580 | Goodrich | June 13, 1950 |
| 2,598,668 | Barry | June 3, 1952 |